(12) United States Patent
Park et al.

(10) Patent No.: US 7,387,735 B2
(45) Date of Patent: Jun. 17, 2008

(54) METHOD OF ISOLATING SEMICONDUCTING CARBON NANOTUBES

(75) Inventors: Wan-jun Park, Seoul (KR); Young-hee Lee, Suwon-si (KR); Cheol-min Yang, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 472 days.

(21) Appl. No.: 11/024,964

(22) Filed: Dec. 30, 2004

(65) Prior Publication Data
US 2005/0214198 A1 Sep. 29, 2005

(30) Foreign Application Priority Data
Jan. 2, 2004 (KR) .................. 10-2004-0000052

(51) Int. Cl.
*B01D 61/00* (2006.01)
*B01C 5/00* (2006.01)
*D01F 9/12* (2006.01)

(52) U.S. Cl. .............. 210/651; 210/650; 210/767; 977/750; 977/745; 977/748; 977/789; 423/447.1; 423/447.3

(58) Field of Classification Search ........ 210/650–651, 210/767, 774; 977/750, 789, 745, 748; 423/447.1, 423/460, 445 B, 447.2, 447.3, 450, 444, 423/445 R
See application file for complete search history.

(56) References Cited

U.S. PATENT DOCUMENTS 5,697,061 A * 12/1997 Krueger et al. ............... 455/39
6,683,783 B1 * 1/2004 Smalley et al. ............. 361/502
6,749,827 B2 * 6/2004 Smalley et al. .......... 423/447.3
6,936,233 B2 * 8/2005 Smalley et al. .......... 423/447.1
7,008,604 B2 * 3/2006 Smalley et al. .......... 423/447.1
7,061,749 B2 * 6/2006 Liu et al. .................... 361/502
7,125,533 B2 * 10/2006 Khabashesku et al. ... 423/447.1

FOREIGN PATENT DOCUMENTS

KR    2002-0024476    3/2002

OTHER PUBLICATIONS

Georgakilas, Purification of HiPCO Carbon Nanotubes via Organic Functionalization; JACS communications, Nov. 9, 2002.*
Chattopadhyay, et al., "A Route for Bulk Separation of Semiconducting from Metallic Sing-Wall Carbon Nanotubes", J. Am. Chem. Soc., 125:3370-3375 (2003).
Kamaras, et al., "Covalent Bond Formation to a Carbon Nanotube Metal", Science, 302:1501 (Sep. 12, 2003).
Strano, et al., "Electronic Structure Control of Single-Walled Carbon Nanotube Functionalization", Science, 301:1519-1522 (Sep. 12, 2003).

* cited by examiner

*Primary Examiner*—Ana Fortuna
(74) *Attorney, Agent, or Firm*—Lee & Morse, P.C.

(57) ABSTRACT

A method of isolating semiconducting carbon nanotubes includes mixing carbon nanotubes with a mixed acid solution of nitric acid and sulfuric acid to obtain a dispersion of carbon nanotubes, stirring the carbon nanotube dispersion, and filtering the carbon nanotube dispersion. Functional groups remaining on the filtered carbon nanotubes may then be removed, e.g., via heating.

15 Claims, 2 Drawing Sheets

METHOD OF ISOLATING SEMICONDUCTING CARBON NANOTUBES

BACKGROUND OF THE INVENTION

1. Field of the Invention

The present invention relates to a method of isolating single-walled carbon nanotubes. More particularly, the present invention relates to a method of isolating semiconducting carbon nanotubes having a specific chirality.

2. Description of the Related Art

Carbon nanotubes have anisotropic structures with various shapes, e.g., single-walled, multi-walled, and rope-like, which range in diameter from several nanometers to several tens of nanometers and range in length from several tens of microns to several hundreds of microns. Carbon nanotubes exhibit conductive or semiconductive properties depending on their chirality. Carbon nanotube powders contain a mixture of semiconducting carbon nanotubes and metallic carbon nanotubes. When carbon nanotubes have an arm-chair structure, they exhibit metallic properties, and when they have a zig-zag structure, they exhibit semiconductive properties. A semiconducting carbon nanotube has a quasi one-dimensional structure and an energy gap varying depending on its diameter, thus exhibiting a unique quantum effect.

Carbon nanotubes, which are hollow, are mechanically strong (about 100 times stronger than steel), chemically stable, and have high thermal conductivity. Thus, carbon nanotubes have been highlighted as a new functional material expected to have many microscopic and macroscopic applications. Extensive research has been conducted into using carbon nanotubes in various applications, e.g., in memory devices, electron amplifiers, gas sensors, microwave shields, electrode pole plates in electrochemical storage units (secondary batteries, fuel cells, or super capacitors), field emission displays (FEDs), and polymer composites.

To make these applications of carbon nanotubes practical, it is necessary to obtain carbon nanotubes having a specific chirality. For example, semiconducting carbon nanotubes are used in memory devices, sensors, etc., and metallic carbon nanotubes are used in electrode materials of cells, electromagnetic shields, etc. Thus, there is a need for a method of selectively producing carbon nanotubes having a specific chirality, or a method of isolating carbon nanotubes having a specific chirality from a group of carbon nanotubes.

Carbon nanotubes are commonly produced by chemical vapor deposition (CVD). However, it is difficult to selectively produce carbon nanotubes having a desired chirality using CVD. Methods of producing carbon nanotubes having specific chirality using electric discharging or laser deposition have been proposed. However, these methods have low yields. In addition, the use of a laser increases the cost of production, and perfect selective growth of carbon nanotubes having desired characteristics (conductive or semiconductive) cannot be attained.

Thus, research has been conducted into developing methods of growing a mixture of semiconducting carbon nanotubes and metallic carbon nanotubes and subsequently excluding unwanted carbon nanotubes.

A method using a surfactant, e.g., octadecylamine (ODA), has been suggested. In this method, after isolating chiral carbon nanotubes, the surfactant must be removed from the carbon nanotubes, resulting in a complicated process and low yield.

A method of isolating metallic carbon nanotubes has been proposed. The method includes dispersing carbon nanotubes in a solution and causing metallic carbon nanotubes to become attached to an electrode by electrophoresis. In this method, yield is low and it is difficult to produce the metallic carbon nanotubes having specific chirality in large quantities.

Another method of isolating carbon nanotubes having a desired chirality includes connecting both ends of carbon nanotubes to an electrode in parallel and applying a pulse voltage in a predetermined temperature range to remove carbon nanotubes having undesired chirality. However, in this method, it is difficult to connect the carbon nanotubes in parallel, and this method is not suitable for producing the desired carbon nanotubes in large quantities.

SUMMARY OF THE INVENTION

The present invention is therefore directed to a method of isolating semiconducting nanotubes, which substantially overcomes one or more of the problems due to the limitations and disadvantages of the related art.

It is therefore a feature of an embodiment of the present invention to provide a method of isolating semiconducting carbon nanotubes in large quantities.

It is another feature of an embodiment of the present invention to provide a method of isolating semiconducting carbon nanotubes via a simplified process.

At least one of the above and other features and advantages may be realized by providing a method of isolating semiconducting carbon nanotubes, including mixing carbon nanotubes with a mixed acid solution of nitric acid and sulfuric acid to obtain a carbon nanotube dispersion, stirring the carbon nanotube dispersion, and filtering the carbon nanotube dispersion.

A volume ratio of nitric acid:sulfuric acid in the mixed acid solution may be in the range of about 1:9 to 2:8. Stirring may be performed for about one to three hours. Filtering of the carbon nanotube dispersion may be performed using a filter having micropores about several microns in size.

The method may further include removing functional groups from filtered carbon nanotubes. Removing functional groups may include heating the filtered carbon nanotubes. Heating of the filtered carbon nanotubes may be performed at a temperature of about 600 to 1000° C. Heating of the filtered carbon nanotubes may be performed in a vacuum or in an argon atmosphere.

The method may further include filtering impurities off using a mesh, after stirring the carbon nanotube dispersion. The method may further include purifying crude carbon nanotubes before mixing the carbon nanotubes with the mixed acid solution. The crude carbon nanotubes may be purified by vapor heat treatment or acid treatment.

At least one of the above and other features and advantages of the present invention may be realized by providing a method of isolating semiconducting carbon nanotubes, including mixing carbon nanotubes with a mixed solution to obtain a carbon nanotube dispersion, stirring the carbon nanotube dispersion, the stirring with the mixed solution altering a structure of undesired carbon nanotubes, and filtering the carbon nanotube dispersion.

The method may further include removing functional groups from filtered carbon nanotubes. The mixed solution may include nitronium ions.

Altering the structure of the undesired carbon nanotubes may include breaking a C—C bond of the undesired carbon nanotubes. Mixing the carbon nanotubes with the mixed solution may also purify the carbon nanotubes.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF THE INVENTION

Korean Patent Application No. 2004-52, filed on Jan. 2, 2004, in the Korean Intellectual Property Office, and entitled: "Method of Isolating Semiconducting Carbon Nanotubes," is incorporated by reference herein in its entirety.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art.

A method of isolating semiconducting carbon nanotubes according to an embodiment of the present invention includes mixing carbon nanotubes with a mixed acid solution of nitric acid and sulfuric acid to obtain a dispersion of carbon nanotubes, stirring the carbon nanotube dispersion, and filtering the carbon nanotube dispersion. The filtered carbon nanotubes may be heated to remove functional groups. This method enables massive carbon nanotube powder samples to be treated in a single step, unlike conventional methods, and has a high isolation efficiency.

Figure 1:
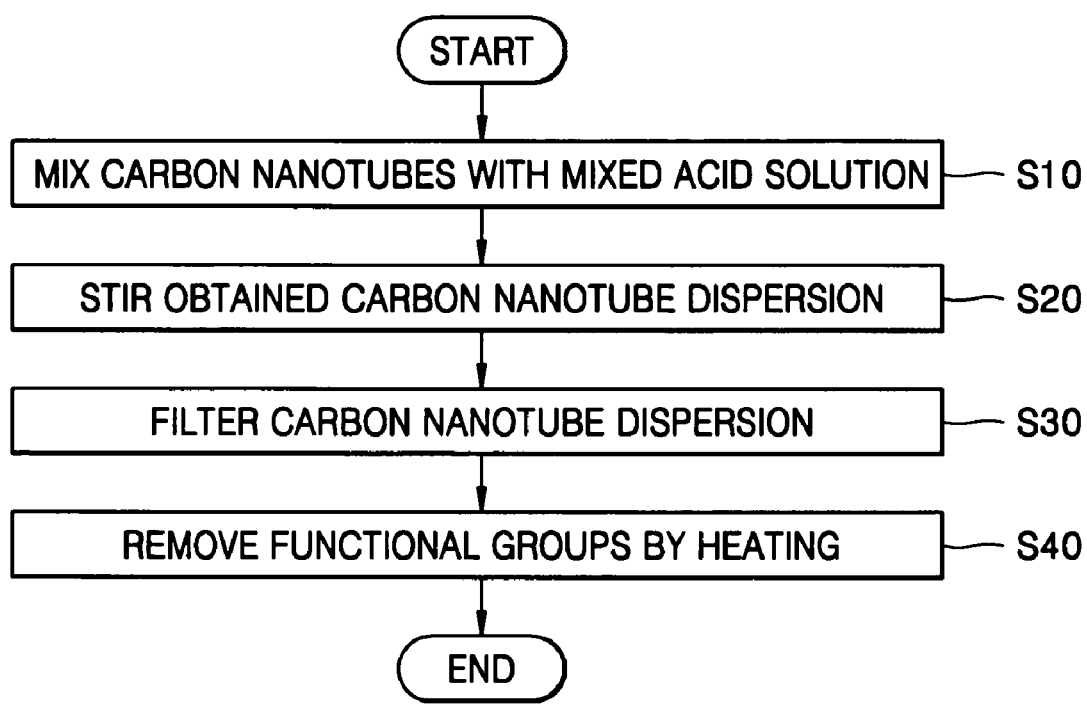
FIG. 1 is a flowchart illustrating a method of isolating semiconducting carbon nanotubes according to an embodiment of the present invention.

FIG. 1 is a flowchart illustrating a method of isolating semiconducting carbon nanotubes according to an embodiment of the present invention.

The carbon nanotubes used in the embodiment of the present invention may be purified or crude carbon nanotubes. The carbon nanotubes may be produced using any conventional method. For example, any crude carbon nanotubes produced by electric discharge, laser deposition, vapor synthesis, plasma chemical vapor deposition, or thermal chemical vapor deposition can be used.

In step S10, after the carbon nanotubes are prepared, nitric acid and sulfuric acid are mixed in a suitable ratio to produce a mixed acid solution, and then the carbon nanotubes are mixed with the mixed acid solution to obtain a dispersion of carbon nanotubes. Sulfuric acid in the mixed acid solution reacts with nitric acid to increase the concentration of nitronium ions ($NO_2^+$). The nitronium ions are electrophilic and are generally used to introduce a nitro group into a benzene ring. It is believed that when used for carbon nanotubes, the nitronium ions function as an electrophilic group for electrons present in $SP^2$ orbitals between carbon atoms in carbon nanotubes. In this case, metallic carbon nanotubes more readily function as electron donors than semiconducting carbon nanotubes. Thus, a C—C bond in the metallic carbon nanotubes is broken and replaced with a C—N bond. As bonds between metallic carbon nanotubes break, the metallic carbon nanotubes become shortened. During stirring, sulfuric acid groups are inserted between bundles of carbon nanotubes, widening intervals between the bundles. Nitronium ions are inserted between the more widely spaced-apart bundles, and react with carbon nanotubes more easily.

The method according to the present embodiment can remove defective carbon nanotubes as well as metallic carbon nanotubes. This occurs because defective carbon nanotubes have a weak C—C bond, which is more likely to be broken by a nitronium ion.

A volume ratio of nitric acid:sulfuric acid in the mixed acid solution may be selected in a suitable ratio, preferably about 1:9 to 2:8. At these ratios, selective reactivity for the semiconducting carbon nanotubes and the metallic carbon nanotubes is excellent and the isolation efficiency is high.

Next, in step S20, the carbon nanotube dispersion is stirred. The stirring may be performed at room temperature using a conventional stirrer.

The stirring time is in the range of about one to three hours and can be varied depending on the ratio of nitric acid and sulfuric acid in the mixed acid solution. If the stirring time is greater than three hours, the semiconducting carbon nanotubes may also react, i.e., have their C—C bonds broken. The stirring time can also be varied according to the state of the untreated carbon nanotubes.

After the metallic and defective carbon nanotubes are shortened or broken due to reaction with nitronium ions, in step S30, the carbon nanotube dispersion is filtered to obtain semiconducting carbon nanotubes. A filter having micropores several microns in diameter can be used, e.g., a micro filter, an ultra filter, etc. The carbon nanotube dispersion can be diluted with water before and/or during filtering. When the dispersion is poured into the filter having micropores several microns in diameter, the semiconducting carbon nanotubes, which are unreacted and thus relatively long, remain on the filter, while the metallic and defective carbon nanotubes, which have reacted and, thus, are shortened or partially broken, pass through the filter.

Finally, the semiconducting carbon nanotubes obtained from the filtering may have functional groups, such as $NO_2^+$ and $SO_3$, attached to their surface. Thus, in step S40, the filtered carbon nanotubes may be heated to remove the functional groups. The heating temperature may be about 600 to 1000° C. If the heating temperature is less than about 600° C., the functional groups may not be removed. If the heating temperature is greater than about 1000° C., the functional groups may bond with the carbon nanotubes and deteriorate characteristics of the carbon nanotubes. The filtered carbon nanotubes may be heated in a vacuum or in an argon atmosphere. The heating may be performed for at least about thirty minutes to ensure removal of the functional groups.

If the carbon nanotubes used in the present method are crude carbon nanotubes, filtering impurities using a mesh may be performed before filtering the carbon nanotube dispersion using the micro filter, or purifying the crude product may be performed before mixing the carbon nanotubes with the mixed acid solution. To obtain semiconducting carbon nanotubes of high purity, it may be desirable to remove carbon clusters or catalytic metal clusters from the crude product by such filtering or purifying.

Purification of crude carbon nanotubes may be performed using any conventional purifying method, e.g., by vapor heat treatment or acid treatment. In acid treatment, crude carbon nanotubes are submerged in a purification bath containing an acid solution for about one to four hours. An aqueous solution of nitric acid or hydrochloric acid, may be used as the acid solution. $H^+$ ions in the acid solution remove carbon clusters and carbon particles, and $Cl^-$ or $NO_3^-$ ions remove catalytic metal clusters. Then, ultra-pure water is suppplied to the purification bath containing the mixed solution in which the carbon nanotubes are dispersed, causing the acid solution to overflow from the purification bath and rinsing the product. The rinsed product is passed through a metal mesh filter having a size of not greater than about 300 µm to remove carbon clusters, carbon particles and catalytic metal clusters and obtain purified carbon nanotubes.

Since the mixed acid solution is used in the mixing operation of the present embodiment, purifying by acid treatment can be simultaneously accomplished. Thus, without further purifying the crude carbon nanotubes before mixing them with the mixed acid solution, the crude carbon nanotubes may be used in the mixing operation and then impurities may be filtered off using the mesh prior to filtering the semiconducting carbon nanotubes through the micro filter. As described above, in the case of filtering the impurities off prior to filtering the carbon nanotubes using the micro filter, purifying the crude carbon nanotubes by filtering the impurities off and isolating the semiconducting carbon nanotubes may be performed in a single process, thereby increasing efficiency.

During the vapor heat treatment for purification, carbon nanotubes are placed in a boat in the center of a reaction furnace and heated. When an acidic purifying gas, such as hydrochloric acid gas and nitric acid gas, flows into the reaction furnace, hydrogen ions are generated due to thermal decomposition of the purifying gas. The hydrogen ions remove impurities such as carbon clusters, and other thermal decomposition products such as $Cl^-$ or $NO_3^-$ remove catalytic metal clusters.

Hereinafter, the present invention will be described in more detail with reference to examples. These examples are given for the purpose of illustration and are not intended to limit the scope of the invention.

EXAMPLE 1

Purified carbon nanotubes were mixed with a mixed acid solution of nitric acid and sulphuric acid in a volume ratio of 1:9 to obtain a dispersion of carbon nanotubes. The carbon nanotube dispersion was stirred for three hours using a stirrer. Then, the carbon nanotube dispersion was filtered through a micro filter while mixing and diluting it with pure water. Finally, the filtered semiconducting carbon nanotubes were placed into a vacuum furnace and heated at 700° C. for one hour to obtain semiconducting carbon nanotubes.

EXAMPLE 2

Semiconducting carbon nanotubes were obtained in the same manner as in Example 1, except that the volume ratio of nitric acid:sulfuric acid in the mixed acid solution was 2:8 and the stirring time was two hours.

Experiment 1

Figure 2:
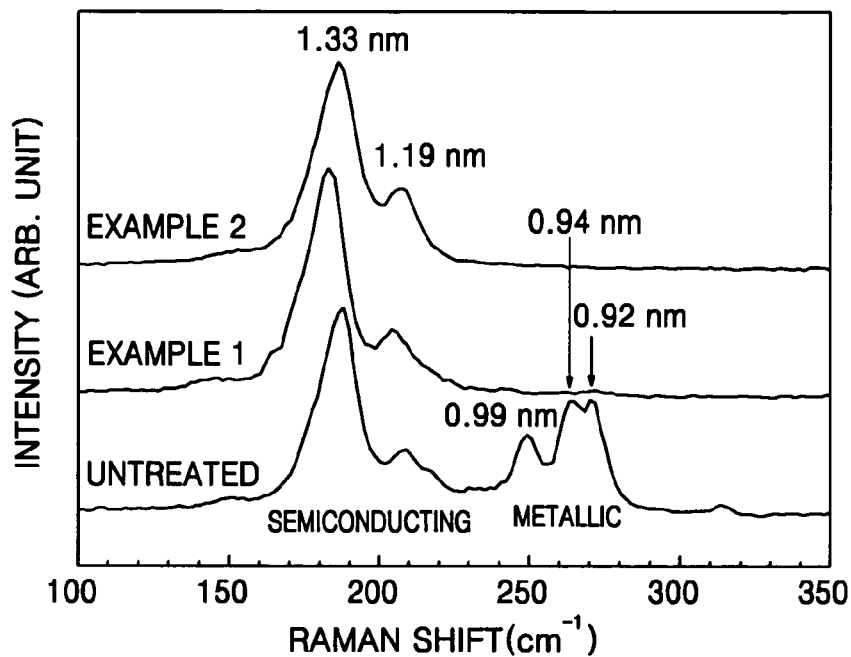
FIG. 2 is a graph illustrating the results of Raman scattering tests for respective carbon nanotubes treated in Examples 1 and 2.
Figure 3:
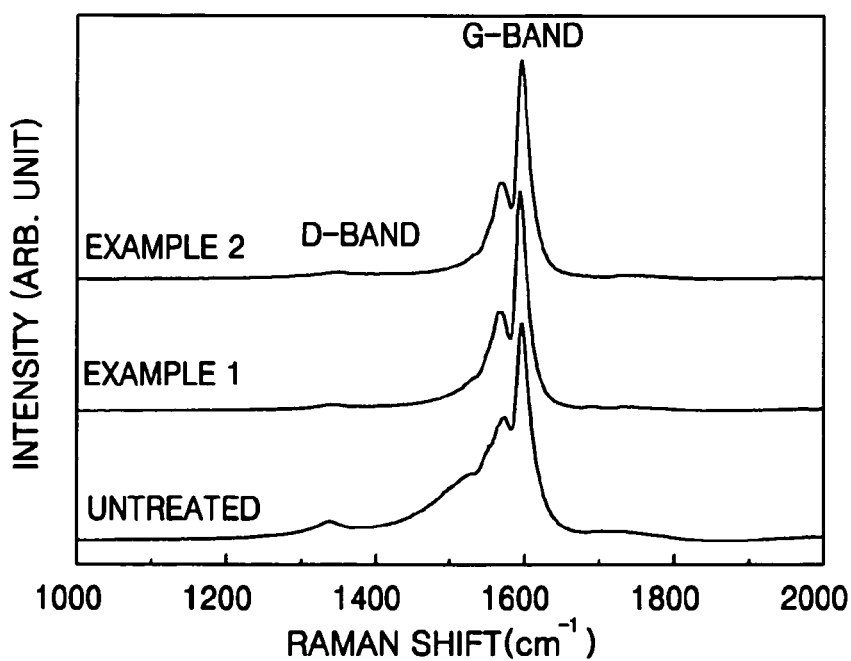
FIG. 3 is a graph illustrating the results of Raman scattering tests for respective carbon nanotubes treated in Examples 1 and 2.

The diameter distribution and chirality distribution of the semiconducting carbon nanotubes obtained in Examples 1 and 2 were measured using Raman scattering testing and absorption testing. The results are shown in FIGS. 2 and 3. Referring to FIG. 2, peaks corresponding to metallic carbon nanotubes were observed in untreated carbon nanotubes, but were not observed in the carbon nanotubes obtained in Examples 1 and 2. Referring to FIG. 3, a defect peak (D-band) near 1300 $cm^{-1}$ was observed in the untreated carbon nanotubes, but was not observed in the carbon nanotubes obtained in Examples 1 and 2. Thus, it was confirmed that the method according to the embodiment of the present invention enables highly efficient isolation of large quantities of semiconducting carbon nanotubes while removing undesired carbon nanotubes, i.e., metallic or defective carbon nanotubes.

As described above, according to the embodiment of the present invention, large quantities of highly pure semiconducting carbon nanotubes can be isolated, which in turn enhances the applicability of carbon nanotubes in memory devices, sensors, etc. In addition, defective carbon nanotubes can be removed simultaneously. Furthermore, purification of crude carbon nanotubes and isolation of semiconducting carbon nanotubes may be performed simultaneously, thus increasing efficiency.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A method of isolating semiconducting carbon nanotubes, comprising:
   mixing carbon nanotubes with a mixed acid solution of nitric acid and sulfuric acid to obtain a carbon nanotube dispersion;
   stirring the carbon nanotube dispersion at room temperature; and
   filtering the carbon nanotube dispersion;
   wherein a volume ratio of nitric acid: sulfuric acid in the mixed acid solution is in the range of about 1:9 to about 2:8.

2. The method as claimed in claim 1, wherein the stirring is performed for about one to three hours.

3. The method as claimed in claim 1, wherein the filtering of the carbon nanotube dispersion is performed using a filter having micropores about several microns in size.

4. The method as claimed in claim 1, further comprising removing from filtered carbon nanotubes functional groups formed during the stirring.

5. The method as claimed in claim 4, wherein removing functional groups comprises heating the filtered carbon nanotubes.

6. The method as claimed in claim 5, wherein the heating of the filtered carbon nanotubes is performed at a temperature of about 600 to 1000° C.

7. The method as claimed in claim 5, wherein the heating of the filtered carbon nanotubes is performed in a vacuum or in an argon atmosphere.

8. The method as claimed in claim 1, further comprising filtering impurities using a mesh, after stirring the carbon nanotube dispersion.

9. The method as claimed in claim 1, further comprising purifying crude carbon nanotubes before mixing the carbon nanotubes with the mixed acid solution.

10. The method as claimed in claim 9, wherein the crude carbon nanotubes are purified by vapor heat treatment or acid treatment.

11. The method as claimed in claim 1, wherein filtering the carbon nanotube dispersion includes removing the semiconducting carbon nanotubes from the carbon nanotube dispersion.

12. The method as claimed in claim 1, wherein stirring the carbon nanotube dispersion includes reacting the carbon nanotubes with at least a nitronium ion.

13. The method as claimed in claim 12, wherein reacting the carbon nanotubes includes selectively shortening a portion of the carbon nanotubes in the carbon nanotube dispersion.

14. The method as claimed in claim 13, wherein selectively shortening a portion of the carbon nanotubes includes shortening metallic carbon nanotubes in the carbon nanotube dispersion relative to the semiconducting nanotubes therein.

15. The method as claimed in claim 14, wherein filtering the carbon nanotube dispersion includes separating the metallic carbon nanotubes from the semiconducting carbon nanotubes.

* * * * *